Oct. 10, 1961 R. E. C. FREDRICKSON 3,003,894
RENDERING STARCH FLUIDIZABLE
Filed Sept. 17, 1959
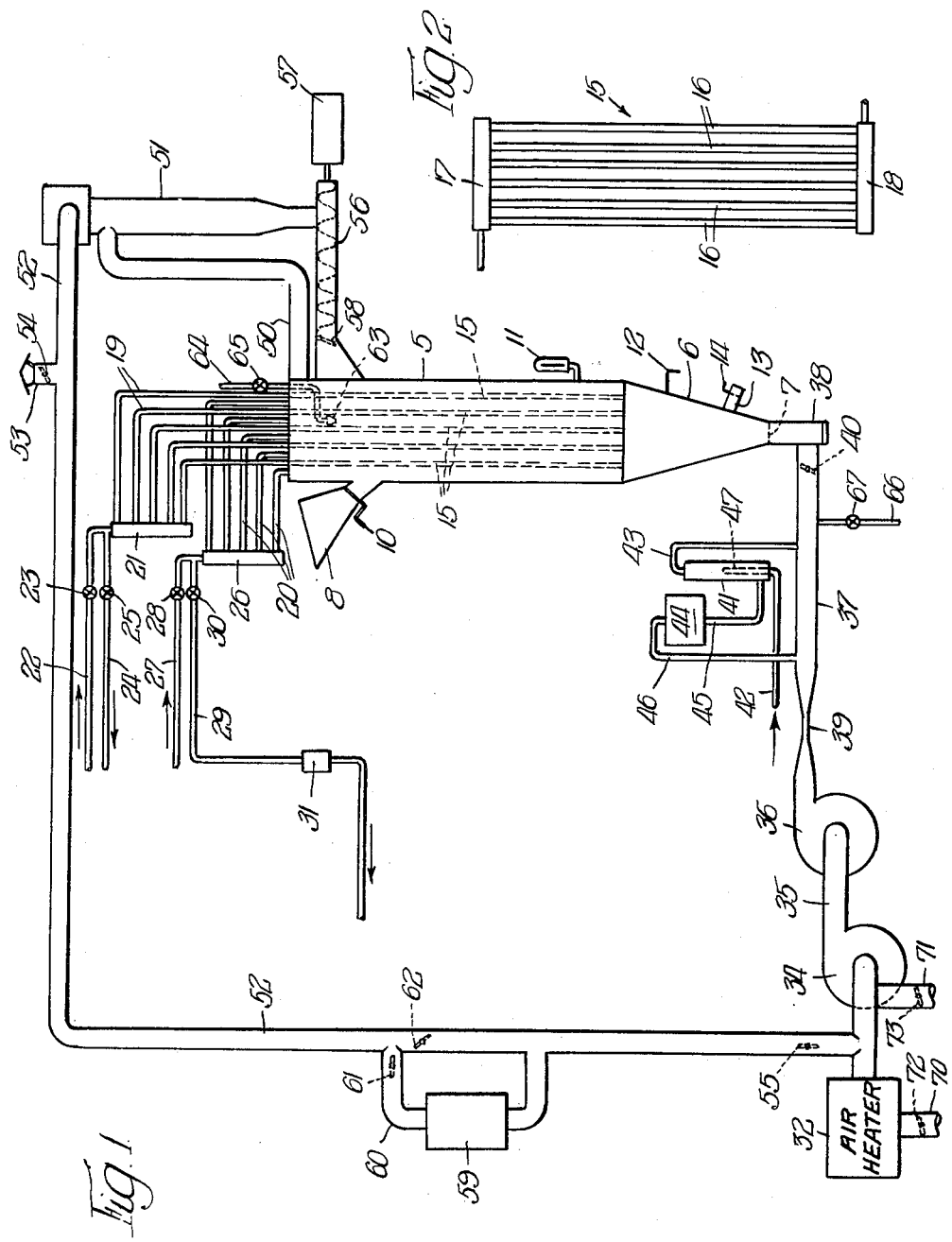
INVENTOR.
Ralph E. C. Fredrickson,
BY
Cromwell, Greist & Warden
Attys

3,003,894
RENDERING STARCH FLUIDIZABLE
Ralph E. C. Fredrickson, Decatur, Ill., assignor to A. E. Staley Manufacturing Co., Decatur, Ill., a corporation of Delaware
Filed Sept. 17, 1959, Ser. No. 839,274
2 Claims. (Cl. 127—71)

This invention relates to innovations in fluidizing starch powder whereby the bulk density of the fluidized starch can be substantially reduced, and whereby starch powder which normally cannot be fluidized because of the presence of oil, may be rendered fluidizable.

It was discovered in accordance with this invention that the addition of a fraction of a percent of calcium phosphate, $Ca_3(PO_4)_2$, to starch had marked effects on the fluidizing of starch powder. Thus, it was discovered that the addition or presence of a slight amount of oil destroyed the fluidizability of starch powder, but that it could be restored by addition of a fractional percent of calcium phosphate, $Ca_3(PO_4)_2$. Also, it was discovered that a fraction of a percent of $Ca_3(PO_4)_2$ would substantially reduce the bulk density of fluidized starch. This fluidizing action of calcium phosphate, $Ca_3(PO_4)_2$ appears to be specific since it is not obtainable with monocalcium phosphate, $CaH_4(PO_4)_2$, for example.

The present invention is a continuation-in-part of my prior co-pending application Serial No. 745,232, filed April 10, 1958, now abandoned, which was a division of my prior co-pending application Serial No. 432,653, filed May 27, 1954, now Patent 2,845,368.

Dextrins are manufactured from starch by heating dry starch, alone or in the presence of various catalysts, until a desired change in properties, i.e., conversion, has been achieved. Chemically, dextrinization is a process for the de-polymerization of the starch molecules. There are several types of dextrin produced commercially, depending upon the particular method of manufacture involved. When starch is heated dry with no catalyst added, the resulting dextrin products obtained are usually referred to as "British gums." Most dextrins are manufactured with the use of a small amount of an acid catalyst such as hydrochloric acid. Basic catalysts may also be used in the productions of dextrins by the dry method.

Conventional processes for producing dextrins commercially have remained in use for a number of years, without material change. In general, these commercial processes are of a batch nature and involve heating dry starch in mechanically agitated vessels which are equipped with various heating arrangements. Patent No. 2,332,345, dated October 19, 1943, makes reference to four general types of dextrin cookers which have been used to carry out the conventional batch dextrinization process. While a number of special dextrin cookers and processes have been proposed, the fact remains that the bulk of the dextrin production is still produced by essentially a conventional batch process in essentially a conventional dextrin cooker.

The conventional batch dextrinization process is inherently very slow and inefficient. If the starch is heated too rapidly, the moisture evolved condenses on the starch and the entire batch will be quickly transformed into a hard glassy mass which has to be removed from the dextrin cooker by digging and chiseling. Hence, the practice is to heat each batch of starch very slowly until its temperature is gradually raised to a point where the starch is dry and converted to a dextrin. Even after the dextrinization is complete, considerable cooling times are required because of the limited cooling surfaces and low heat transfer coefficients of the equipment used. The conventional batch process takes from 3 to 24 hours depending primarily upon the type of dextrin prepared.

It was determined by means of suitable experiments that the dextrinization reaction itself is not inherently a slow reaction, but, on the contrary, is a surprisingly rapid one. Thus, when properly acidified dry starch powder was spread in a thin layer on a preheated metal plate and immediately covered with a similarly heated plate, it was found that substantial conversion, i.e., dextrinization, occurred in as little as 30 seconds. Therefore, it was evident from these experiments that it was at least theoretically possible to produce dextrins in a very short period of time if suitable means could be provided whereby the temperature of the starch could be quickly raised to the desired dextrinizing temperatures and then quickly cooled after dextrinization.

It was unexpectedly discovered according to my invention as disclosed in Patent 2,845,368 that the dextrinization process could be carried out very practically and quickly in a fraction of the usual time by drying, converting and cooling starch while in a fluidized condition. By employing this technique it was possible to design equipment whereby the heat transfer would be such that the starch could be quickly heated and cooled without charring or other damage and at the same time the moisture evolved from the starch could be vented or removed sufficiently fast so as to avoid local condensation and resultant formation of balls or lumps. Originally, it had not been considered practical to fluidize starch since theoretically this would be impossible on the basis of Stokes' law. Thus, according to Stokes' law the settling rate of the largest starch cell (i.e., 20 microns) would be about 0.056 foot per second. Theoretically, with velocities of fluidizing gas at or above this value the starch would be blown out of the vessel. However, contrary to what should have been expected, it was discovered that gas velocities even ten times as great as the Stokes' law maximum would not result in undue amounts of starch being blown from the vessel. By means of experiment it was ascertained that the gas velocities required for uniform fluidization and also for satisfactory moisture venting or removal of moisture from the starch did not blow or convey excessive amounts of starch out of the vessel, Stokes' law to the contrary notwithstanding. Furthermore, most of the starch entrained at the the higher velocities could be easily separated and returned. By re-cycling the fluidizing gas, all of the entrained starch would be returned to the bed.

These unexpected findings were verified first with laboratory apparatus wherein it was found possible to uniformly dextrinize a batch of starch by the fluidization technique in a matter of 10–20 minutes, depending on the degree of dextrinization desired. Thereafter semicommercial production apparatus was designed and successfully operated for the manufacture of dextrins by the fluidization technique of this invention. It was established therein that the process could not only be carried out rapidly but also very uniformly and that it was highly flexible with regard to the addition of acid or other catalyst, drying, neutralizing, moisture-conditioning, and blending of small amounts of other ingredients such as borax. Therefore, as a net result of the invention, it is entirely possible to effect very large economies in the initial cost of a dextrinizing plant, and to produce an improved quality of dextrin of any desired type or grade. Because the process is easily controlled, and fire and explosion hazards can be reduced to a minimum, the process may be carried out very efficiently with a minimum of supervision and operating expense.

The term "fluidization" or the expression "fluidized condition" is commonly understood in the chemical processing art to refer to and designate that condition in which a powdered or granulated material is suspended by means of passing a gas upwardly therethrough at appropriate velocity whereby the body of powdered material resembles in appearance and for many purposes a true fluid or liquid. The fluidization technique has been applied rather extensively in the petroleum refining industry wherin various catalysts in the form of fine dry powders are fluidized in columns and gases and vapors are passed therethrough so as to obtain chemical reactions therebetween which are catalyzed by a fluidized catalyst. In that particular process the fluidized condition makes it possible to obtain an extremely high degree of contact between the catalyst and the reactant gases or vapors. The fluidization technique has also been applied quite extensively in the processing of pulverized coal in order to distill off volatile matter from fluidized beds of powdered coal.

While the fluidization technique has been used for a number of years and has even been highly developed in connection with certain chemical process industries, it has not been applied to the treatment of starch and more particularly it has not been used in connection with the production of dextrins from dry starch.

Accordingly, a general object of this invention is the successful application of the principle or phenomenon of fluidization or the fluidized condition to the treatment and handling of starch.

A more specific object of the invention is the use of a fractional percent of calcium phosphate to restore fluidizability to starch containing oil. Another related object is to reduce the bulk density of fluidized starch by addition of a small amount of calcium phosphate.

Certain other objects of the invention will, in part, be obvious, and will in part appear hereinafter.

For a more complete understanding of the nature and scope of the invention, reference may now be had to the following detailed description thereof taken in connection with the accompanying drawing, wherein:

FIG. 1 is a diagrammatic view of apparatus suitable for practicing the invention on a commercial production basis; and FIG. 2 is a side elevational view of one of the heating coils or plates disposed in the vessel in the apparatus in FIG. 1 wherein a bed of starch is fluidized.

Referring now to the drawing, a vertical cylindrical vessel is designated at 5 and it is in this that the starch is fluidized and the dextrinization and related steps conducted. The bottom of the vessel 5 is provided with a conical section 6 at the bottom of which is located a perforated aeration plate or grate 7. In one construction, which proved to be very satisfactory in operation, the vessel 5 had a diameter of 3 feet and a height of 13 feet. The conical section 6 had a height of 5.51 and tapered from the 3 foot diameter at the top to a diameter of 8 inches at the bottom. The aeration plate 7 was provided with forty-one ⅜ inch holes suitably arranged so as to give an equal distribution of the fluidizing gases passing upwardly therethrough.

Starch and other desired materials are charged into the vessel 5 through a charging hopper 8 located adjacent the top of the vessel. The hopper spout is provided with a slide type valve 10 which remains closed except when the vessel 5 is being charged. It will be appreciated that other types of feeding arrangements could be used, including those with air locks or screw conveyors so that materials may be fed into the vessel 5 without shutting off the fluidizing gas.

The vessel 5 is provided with an indicating thermometer 11 and may be provided with other suitable equipment such as pressure gauges, sight windows, and, if desired, various automatic recording devices for recording temperatures, pressures and humidities. A sampler 12 is provided in the side of the conical section 6 whereby samll samples of the contents of the dextrinizer may be removed from time to time for testing. The conical section 6 is also provided adjacent the bottom thereof with a packing-out or discharge spout 13 provided with a suitable slide valve 14 which will be normally closed and will be open when the contents of the vessel are being discharged into bags or other suitable containers.

In order to heat the fluidized starch within the vessel 5 during the drying and dextrinizing steps, and to subsequently cool and condition it, a plurality of heat exchangers 15—15 are suitably mounted within the vessel 5. Each of the heat exchangers 15 may be flat and generally rectangular in form and made up of a number of vertical tubes 16 (FIG. 2) joined together at the top and bottom by headers 17 and 18 having projecting connections, as shown. Steam or water or any other heating or cooling fluid may be introduced into the heat exchangers 15 and circulated therethrough in either direction, as desired. It will be understood that many other types and designs of heating (or cooling) devices may be used. Five connections for introducing heating steam (and for withdrawing cooling water) into the units 15 are designated at 19—19 while five connections for introducing cooling water (and for removing condensate or cooled steam) are indicated at 20—20. The bottom ends of the pipes 19 may be connected to the upper header 17 and the bottom ends of the pipes 20 may be connected to the bottom header 18. The outer ends of the inlet connections 19 are all connected to an external header pipe 21. A steam supply line 22 provided with a valve 23 is connected to the header 21 as is also a cooling water discharge line 24 provided with a valve 25.

A header 26 is provided which is connected to each of the lines 20. Adjacent one end the header 26 is connected to a cooling water inlet line 27 provided with a valve 28 and condensate discharge line 29 provided with a valve 30. Outwardly from the valve 30 the line 29 is provided with a condensate trap 31.

It will be understood that other types of heat exchanger arrangements and piping connections may be used, and that the walls of the vessel 5 may be provided with heat exchanger surfaces, if desired.

It has been found that the heat transfer coefficient is about 40 B.t.u. per hour per degree F., per square foot of heating surface exposed to the fluidized starch. The heat transfer coefficient should be considered in conjunction with a ratio of heating surface area to the weight of the starch. In the apparatus described this ratio is approximately 8 square feet to one hundred pounds of starch. Such a heat transfer coefficient combined with such a ratio of heating surface area to the weight of the starch permits the attainment of a much higher heat flux than is possible in conventional commercial dextrin cookers. However, it would not be possible to make use of such a high flux if it were not for the fact that when starch is heated in the fluidized condition there is no difficulty involved in venting or removing the moisture as rapidly as it is evolved from the starch. In the case of conventional dextrin cookers, the difficulty of venting or removing the evolved moisture severely limits the rate at which the batches of starch can be heated during the drying phase of the dextrinizing cycle.

While, after the drying phase, the heating rate in conventional starch dextrinizers is no longer limited by venting considerations, it is limited by the ratio of heating surface to the weight of starch. In one common prior art starch cooker or dextrinizer which holds about 2500 pounds of starch, this ratio is about 4 square feet of heating surface per one hundred pounds of starch, which is approximately one-half of the same ratio for the fluidizer vessel 5 shown in FIG. 1 of the drawing. Accordingly, even after the drying phase it is possible in the fluidizer vessel 5 to heat the starch at approximately twice the rate that it can be heated in a conventional batch cooker or dextrinizer.

While the heating surface ratio in the fluidizer vessel 5 is approximately twice the ratio for a conventional starch cooker or dextrinizer, the cost is little if any more since it is possible to obtain this heating area by means of internal heat exchanger units at approximately one-half the cost per square foot of equivalent heating area in the form of a jacketed heating surface as used in conventional cookers. In addition to the substantial savings in cost, it is also possible with the use of internal heating units to maintain or even exceed the ratio of about 8 square feet heating surface per one hundred pounds of starch regardless of the vessel size, whereas, in the conventional jacketed starch cooker the ratio of 4 square feet per one hundred pounds is approximately the maximum and with larger sized vessels this ratio drops off for geometrical considerations involving surface to volume ratios. Accordingly, as the result of the great differences in the heating capacities involved, a single practically sized fluidizer vessel may have, for example, a dextrin output capacity equal to that of 16 conventional sized (2500 pounds) starch cookers and four associated coolers. This results in large initial investment savings in equipment and buildings as well as continuous large savings in operating labor and maintenance (i.e. one machine vs. twenty).

In the drawing the means for circulating hot or cool fluidizing gas through the vessel 5 includes an air heater 32 of known type, the discharge opening of which is connected by means of a conduit 33 to the inlet connection of a suitable blower or fan 34. The discharge connection of the blower 34 is in turn connected by means of a conduit 35 to the inlet of a second blower 36. The blowers 34 and 36 may be replaced by a single blower of suitable design characteristics.

The discharge connection of the second blower 36 is connected by a conduit 37 with an inlet connection 38 attached to the bottom end of the conical section 6 of the fluidizer vessel 5. The conduit 37 is provided with a Venturi section 39, as indicated, for use in measuring the flow rate of the gas. The conduit 37 is provided with pressure gauges and with a regulating damper or control valve as indicated at 40.

While various catalysts may be used to treat the starch and accelerate the dextrinizing action with the production of the desired type of product, one catalyst that will often be used is hydrochloric acid. Although the hydrochloric acid or other volatile catalyst could be deposited on the starch ahead of time by spraying and mixing, it can be conveniently added in the present apparatus by vaporizing some of the catalyst directly into the fluidizing gas. Accordingly, for this purpose, a catalyst evaporator 41 is provided which has a steam inlet connection 42 in the bottom and a vapor outlet line 43 at the top which leads into the conduit 37. A catalyst storage tank 44 is provided which has a discharge connection 45 leading from the bottom thereof into the bottom portion of the evaporator 41. A pressure balance line 46 connects between the conduit 37 and the top portion of the storage container 44 so as to overcome the back pressure in the discharge line 45.

When the catalyst is hydrochloric acid, the vaporizer 41 may suitably consist of a Haveg pipe provided with a tantalum bayonet heater indicated in broken line at 47. Various other arrangements for introducing a volatile catalyst into the fluidizing gas may be designed and used.

The means employed for vaporizing hydrochloric acid or other catalyst and adding the vapors to the fluidizing gas may also be used for vaporizing and adding a volatile neutralizing agent (e.g. ammonia) to arrest the dextrinizing reaction. If desired, separate means may be used for each agent.

The fluidizing gas is withdrawn or discharged from the top of the vessel 5 through a conduit 50 which leads into a multicone separator 51 of known type. The exhaust connection of this dust separator 51 is connected by a re-cycle conduit 52 to the conduit 33 ahead of the connection into the blower or fan 34. If desired, all or part of the gas discharged from the dust separator may be discharged to atmosphere through a conduit or vent 53 connected with the conduit 52 adjacent the exhaust dust collector 51. The vent 53 is provided with a regulating damper 54 and the re-cycle conduit 52 is likewise provided with a regulating damper 55. It will be seen that by proper regulation of these dampers all of the discharged gas or air may be vented to atmosphere, or all may be re-cycled, or any desired intermediate ratio may be obtained.

The settled or separated dust from the separator 51 discharges into a screw-type conveyor 56 which is driven by a suitable motor as indicated at 57. The discharge end of the conveyor 56 discharges into the upper end of the vessel 5. At the end of the screw a one-way valve or air lock 58 is provided which is hinged at the top and is forced open by dust issuing from the end of the screw. Otherwise, the pressure within the vessel 5 will keep this check valve or air lock 58 in the closed condition. If desired, a conveyor similar to the conveyor 56 may be used in connection with the hopper 8 to feed starch into the vessel 5.

While the apparatus as described will operate very satisfactorily, its flexibility may be increased by incorporating additional features. Thus, a condenser and cooler 59 of known design is provided in a branch line 60 provided with a control valve 61 which is operated in conjunction with a control valve 62 in the return line 52. All or part of the re-cycled fluidizing gas may be cooled and the moisture condensed therefrom on passing through the unit 59. It is sometimes desirable to spray a catalyst agent or other material directly into the fluidizer vessel 5. Accordingly, a spray nozzle 63 is located in the top thereof on the bottom end of an inlet pipe 64 provided with a valve 65. Steam may be added to the fluidizing gas when desired, through a steam inlet line 66 provided with a valve 67.

If all or part of the fluidizing gas is being vented, additional gas may be drawn into the system either through the intake 70 to the heater 31 or the intake 71 into the blower 34. The intake 70 is provided with a control damper 72 while the intake 71 is provided with a control damper 73. These dampers will be set as desired.

In operation the vessel 5 is first loaded or charged with up to a ton of powdered starch of commercial moisture content, e.g. 10–13%. The blowers 34 and 36 are started and the control valve 40 is adjusted to give an air flow which will properly fluidize the starch in the vessel 5. When desired, air or other fluidizing gas may be initially heated to the desired temperature by drawing it through the heater 32. Preheating the air in the initial stages avoids condensation on the upper walls of the fluidizing vessel 5 and in the ducts during the early stages. In order to obtain the proper type of fluidization, the air flow must be such that it will insure fluidization of the entire contents of the vessel so that there are no large dead spots or non-fluidized areas. At low flow rates of the fluidizing gas, only the center core of the bed of starch is fluidized. As the flow rate increases the zone of fluidization expands until the entire bed becomes fluidized. It is visualized that there may be two types of fluidization. In one, each of the starch particles oscillates or dances around only in its immediate neighborhood and there is no general transport or movement of the particles in the fluidized bed from one location to another. This fluidized condition is not considered satisfactory for the purposes of this invention. In the second type of fluidization, the particles are rapidly oscillating and they are also being transported by a general movement from one location to another. It is necessary to achieve and maintain this second type of fluidized condition in order to obtain optimum results.

The upper limits of the flow rate of the fluidizing air or gas is determined by the velocity at which the contents of the vessel tend to be conveyed out or blown out therefrom. This is referred to as the conveying velocity.

Generally it is preferred to operate below the upper limits since the power costs increase sharply with increased flow rates. Furthermore, as the flow rate increases there is an increase in dust entrainment. Even though fluidized beds are notable for a high degree of temperature uniformity, the uniformity is not perfect. Therefore, the dew point of the air within the fluidized bed must be maintained above the temperature of the coldest starch therein. Otherwise, if the flow rate of the air or other fluidizing gas is too low for the rate of heat input (or rate of evaporation of moisture from the starch), the dew point of the air may fall low enough so that the moisture condenses on the cool starch localities and form balls of starch. Actually, the apparatus has sufficient flexibility so that a proper relationship of flow rate of the fluidizing gas to the heat input may be readily obtained intermediate the maximum flow rate and minimum flow rate.

After the blowers 34 and 36 have been started, steam is introduced into the coils 15 by opening the valve 23 in the steam supply line 22 and opening the valve 30 in the condensate discharge line 29. Steam pressures in the order of about 150 p.s.i.g. (pounds per square inch gauge) are suitable. After the temperature of the starch reaches about 225° F., the hydrochloric acid vaporizer 41 is placed in operation so as to vaporize the acid into the air stream. For example, sufficient 20° Bé. acid may be volatilized so that sufficient HCl is evaporated to equal 0.1% of the weight of the starch. The conditions within the vessel 5 are followed as the conversion proceeds and samples are removed from time to time for checking purposes. When the proper degree of conversion or dextrinization has been obtained, depending upon the particular dextrin product being produced, the reaction may be quickly arrested by introducing ammonia into the fluidizing gas so as to neutralize the starch. Thereafter, the steam is shut off and cooling water is introduced into the coils 15. After the starch has been cooled to the proper temperature, e.g. 150–170° F., the flow of fluidizing air or other gas is reduced from 200 c.f.m. (cubic feet per minute) to from 20–50 c.f.m. and the dextrin is discharged into bags or other containers through the discharge spout 13.

If it is desirable to blend in with a dextrin a small amount of another material, e.g. borax, the blending may be readily accomplished in this apparatus by temporarily shutting off the fluidizing air and introducing the borax or other material into the vessel through the charging hopper 8. Thereafter, the contents of the vessel are again fluidized and a uniform blend is obtained in the matter of a minute or so.

Prior to and during the dextrinizing process, the moisture content of the starch is reduced to about 1–4%. On standing, the finished dextrin will take on moisture until an equilibrium condition is reached. However, if desired, the moisture content of the dextrin may be immediately adjusted following the dextrinization process in this apparatus. The moisture may be readily added by introducing steam into the air or other fluidizing gas while the dextrin is maintained in a fluidized condition. For example, the fluidizing air may be humidified by the introduction of steam to a dew point of, say, 110° F. and the cooling water tempered to an inlet temperature of about 120° F. so as to prevent condensation on the surfaces of the heat exchanger. The fluidization may then be continued until the dextrin has acquired the desired moisture addition.

Savings in heat can be achieved by re-cycling the fluidizer exit gases. Unless the moist fluidizing gas is passed through the condenser 59, re-cycling should not be started until the starch has been adequately dried, since in the early stages of the operation the air serves to vent and remove the moisture which is evolved from the starch. However, when the starch reaches a temperature of about 300–325° F., it is almost bone dry and then the air may be re-cycled since the humidity of the fluidizing gas or air at that temperature is too low to have an effect on the dextrinization reaction. During re-cycling it is possible to by-pass or shut down the dust separator since there is no dust loss. The re-cycle operation makes it possible to economically use an inert gas, in place of air, as the fluidizing medium. For example, flue gas, carbon dioxide, or nitrogen may be used. Such inert gases eliminate fire and dust explosion hazards.

The apparatus and process are fast in all phases of the dextrinizing operation. Thus, it is possible to dry starch and bring the starch up to a temperature of 360° F. in less than an hour's time depending upon the pressure of the steam, whereas in an efficient type of conventional dextrinizer it requires between 6 to 8 hours to reach the same temperature. In addition, the cooling rate is equally fast and it is possible to cool the dextrinized starch in fluidized condition down from 300° F. to a temperature of 180° F. in approximately 9 minutes whereas to cool the starch in a conventional dextrinizer through the same temperature range requires ten times as long, i.e. 90 minutes.

Furthermore, if it is necessary to blend or mix any additional ingredients such as borax in with the dextrin, uniform blending may be obtained very quickly in a matter of only a minute or two as against a much longer time required in ordinary mixing equipment.

In general, it is possible to carry out complete dextrinizing processes in the apparatus shown and described in connection with FIG. 1 of the drawing in about 1½ to 4 hours, which would require 6 to 12 hours to carry out in a conventional batch-type dextrinizer or dextrin cooker. By increasing the heating surfaces in the vessel 5, which can be done practically and economically, the conversion time can be reduced to a few minutes for dextrins requiring 6½ to 8 hours in conventional equipment. This again brings out the fact that the dextrinizing reaction is itself a rapid one and that the very prolonged times required with conventional equipment are due to limitations imposed on the rate of applying heat to the starch. This limitation, in turn, is due to the inability to vent or remove the moisture as rapidly as it is evolved from the starch and the practical difficulties involved in extensively supplementing the jacketed heat transfer surfaces of mechanically agitated vessels.

According to careful calculations, it has been found that by using the fluidizing process of this invention, it is possible to effect about an 8-fold reduction in building volume and about a 4 to 5-fold reduction in equipment investment. In addition, the operating cost per unit of dextrin produced is reduced many fold. Added to these economic advantages is the greatly increased flexibility made possible and the improvement of product achieved through this flexibility and the fine degree of control which is made possible.

It will be apparent to those skilled in the art that a number of modifications may be made in the fluidizing apparatus and mode of operation thereof as described above and shown in the accompanying drawing. With respect to the apparatus, it will be apparent that the vessel 5 can be provided with a heating jacket in order to add additional heating surfaces, and various designs of heat exchanger units may be used.

With regard to changes in operation, the catalyst may be added in several different forms and manners. For example, dilute hydrochloric acid may be sprayed onto the fluidized contents of the vessel 5 by means of the spray nozzle 63. Other liquid catalysts and neutralizing agents may be added in the same manner. It is also possible to employ solid catalysts and neutralizing agents. For example, instead of using ammonia gas for neutralizing, solid ammonium carbonate or bicarbonate may be added through the charging hopper 8. By providing this hopper with an air lock or star feeder, it is possible to add the neutralizing agent without discontinuing the fluidization process. These solid neutralizers become rapidly blended with the starch before they become volatilized.

The properties of the dextrins are affected by the moisture content of the fluidizing gas. Therefore, steam may be introduced through the line 66 as desired, during and/or after the drying phase and also during and/or after the dextrinizing phase. In one embodiment of the invention, corn starch was dextrinized as described above in the apparatus shown in the drawings with 60% steam by volume being added to the fluidizing gas so as to effect an additional lowering of the dextrin paste viscosity. At the end of the dextrinizing step the steam was slowly shut off and the resulting dextrin was cooled as described above.

In still another embodiment of the invention making use of the apparatus shown in the drawings, after the starch was fluidized and dried, the HCl catalyst was vaporized into the fluidized charge at 300–400° F. and the temperature held until the desired degree of conversion was obtained. The dextrinized starch was then cooled in fluidized condition to 180–275° F. Whereupon it was steamed to reduce the viscosity still further. When the desired reduction in viscosity was obtained, the steam was shut off and the starch was cooled. This particular technique tends to produce lighter colored dextrins of good viscosity stability.

If desired as much as 100% steam may be used as the fluidizing gas so long as the starch or dextrin temperature remains above the dew point. Otherwise, there is condensation and attendant lump formation as described above.

The entire process may be carried out by use of an inert gas such as flue gas, or nitrogen or carbon dioxide. In this case the re-cycled gas will be passed through the cooler and condenser 59 during the drying phase in order to remove moisture from the gas and at the same time cool the gas and thereby reduce the load on the blowers 34 and 36. Instead of using inert gas throughout the entire process, air may be used during the drying phase and this will be vented to the atmosphere. When the drying phase is completed, then the system may be purged with an inert gas, after which the remainder of the process is carried out by re-cycling the gas. Even after the drying phase is completed, the re-cycled gas may be passed through the cooler 59 in order to cool the gas and thereby increase the efficiency of the blowers.

Besides blending in such additives as borax, it was discovered that the addition of a very small percent of calcium phosphate, $Ca_3(PO_4)_2$, was desirable from several standpoints. While all commercial starches that have been tried fluidized equally well, it was discovered that the addition or presence of an extremely small amount of oil on the starch (in the order of a few hundredths of 1%) substantially destroyed the fluidizability of the starch and therefore rendered the present process completely inoperable. While it appears to be unlikely that starch will often be encountered commercially which is non-fluidizable because of the presence of oil, it was discovered that the condition can be easily corrected if it should arise, simply by the addition of a few hundredths of a percent of calcium phosphate, $Ca_3(PO_4)_2$, to the starch. The exact amount of calcium phosphate to be added depends upon the nature of the starch and its oil content. It was also discovered that the addition of calcium phosphate had another interesting and advantageous effect in fluidized systems even where there was no oil and it does not have to be added to render the starch fluidizable. Thus, it was discovered that the addition of about a fraction of a percent of calcium phosphate (e.g. 0.1% based on the weight of the starch), substantially reduced the bulk density of the fluidized starch. Therefore, it was possible to decrease the weight of fluidized starch occupying a given volume and so increase the ratio of heating surface to weight of starch. The addition of calcium phosphate also permits the use of less fluidizing air for a given weight of starch and results in a saving of power for blower operation.

The term "starch" as used herein and in the appended claims is intended to include and cover not only corn starch which has the greatest commercial importance, but also other types of starch such as tapioca, sago, wheat, potato, rice, sorghum, waxy maize and others.

It will be apparent that certain modifications and changes may be made in practicing the invention without departing from the spirit and scope thereof.

I claim:

1. In fluidizing starch powder wherein the powdered starch is suspended by means of passing a gas therethrough, the improvement which comprises adding to the starch powder a fraction of one percent by weight of $Ca_3(PO_4)_2$.

2. In fluidizing starch powder wherein the powdered starch is suspended by means of passing a gas therethrough which starch powder cannot normally be fluidized because of the presence of a small amount of oil therein, the improvement which comprises rendering the said starch powder fluidizable by incorporating therein a fraction of one percent by weight of $Ca_3(PO_4)_2$.

References Cited in the file of this patent

UNITED STATES PATENTS

| | | |
|---|---|---|
| 2,030,461 | Moss | Feb. 11, 1936 |
| 2,720,465 | Fetzer et al. | Oct. 11, 1955 |

OTHER REFERENCES

Fluidization, by Max Leva, McGraw-Hill Book Co., Inc., 1959, pp. 62–68.

Industrial and Engineering Chemistry, February 1933, pp. 142–147.